Sept. 27, 1960  A. B. SEGUR  2,954,134
APPARATUS FOR TRANSFERRING CERAMIC UNITS
Filed Feb. 27, 1957  2 Sheets-Sheet 1
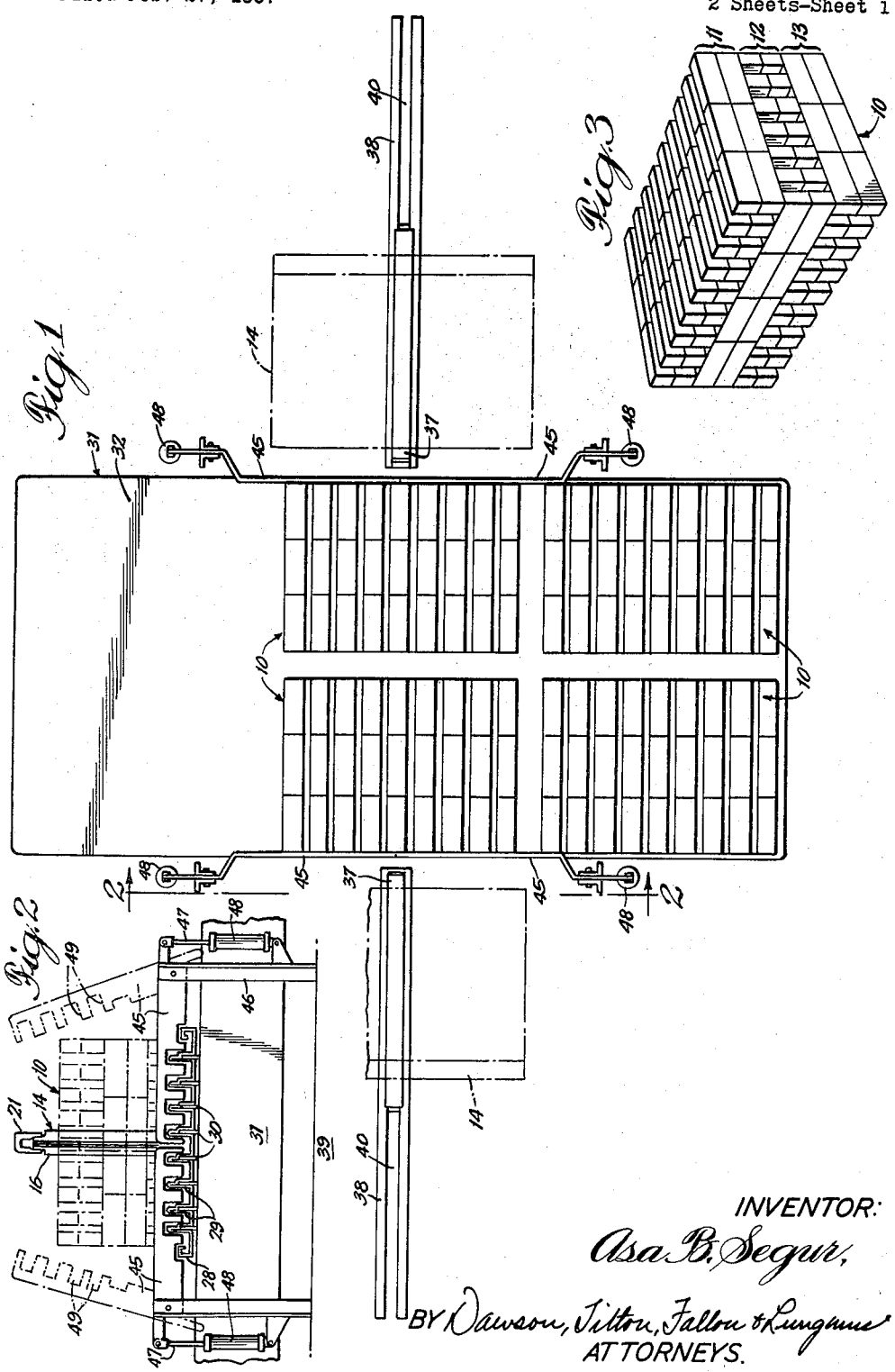
INVENTOR:
Asa B. Segur,
BY Dawson, Tilton, Fallon & Lungmus
ATTORNEYS.

Sept. 27, 1960 A. B. SEGUR 2,954,134
APPARATUS FOR TRANSFERRING CERAMIC UNITS
Filed Feb. 27, 1957 2 Sheets-Sheet 2
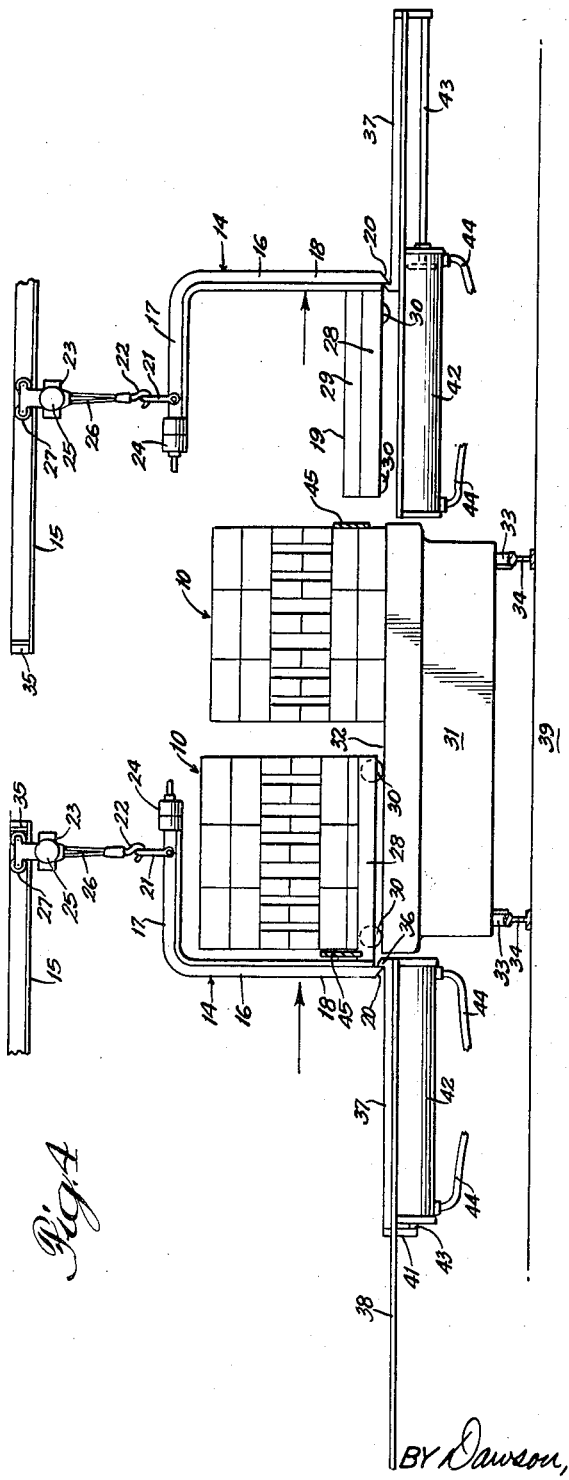
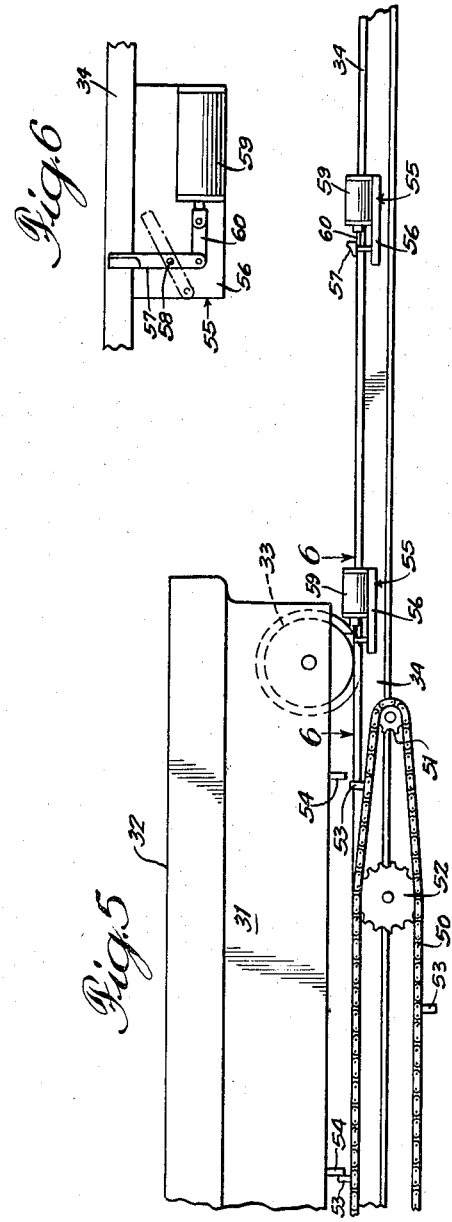
INVENTOR:
Asa B. Segur,
BY Dawson, Tilton, Fallon & Lungmus
ATTORNEYS.

United States Patent Office 2,954,134
Patented Sept. 27, 1960

2,954,134

APPARATUS FOR TRANSFERRING CERAMIC UNITS

Asa B. Segur, 1181 S. Ridgeland, Oak Park, Ill.

Filed Feb. 27, 1957, Ser. No. 642,825

2 Claims. (Cl. 214—41)

This invention relates to an apparatus for transferring ceramic units, and more specifically, to an apparatus particularly useful in transferring a pile setting or hack of ceramic units from a carrier to a horizontal support surface.

One of the main objects of the present invention is to provide means for accurately guiding and positioning a group of bricks or other ceramic units upon a horizontal and movable support surface. Another object is to provide an apparatus for removing a hack of brick from a carrier and for accurately disposing the entire hack upon a selected portion of a support surface. A further object is to provide means for effectively guiding and transferring a stack of bricks or other ceramic units from a platform carrier to a substantially horizontal surface without disarranging or upsetting any of the units in the stack. A still further object is to provide a structure for transferring a hack of discrete ceramic units onto a support surface, such as the platform of a rail car, without the necessity of first laying foundation or "finger" brick to support the hack upon the transfer surface. An additional object is to provide an apparatus adapted for use in simultaneously transferring two or more hacks of brick or tile upon a rail car or other vehicle.

Other objects will appear from the specification and drawings in which:

Figure 1 is a top plan view of an apparatus embodying the present invention, the movable platform carriers being indicated generally by broken lines for the purpose of clearly illustrating the structure therebelow; Figure 2 is a broken sectional side view taken along line 2—2 of Figure 1; Figure 3 is a perspective view illustrating a hack or group of bricks; Figure 4 is a front elevation of the apparatus shown in Figures 1 and 2; Figure 5 is an enlarged broken side elevation of a rail car and means for positioning the same; and Figure 6 is a broken and enlarged top plan view illustrating details of the structure for stopping a rail car at a preselected location, the structure shown being an enlargement of the portion indicated by line 6—6 in Figure 5.

In my copending application, Serial No. 615,268, filed October 11, 1956, I have disclosed an apparatus and method for guiding the placement of discrete ceramic units to form a hack, such as the hack illustrated in Figure 3 and designated generally by the numeral 10. A hack may be defined as a group of bricks or other discrete ceramic units stacked in spaced rows to permit the circulation of air therebetween during a drying or firing operation. The adjacent layers of brick oriented in the same direction are commonly referred to as "courses." In Figure 3, three courses, 11, 12 and 13 are shown, each course being composed of two half-courses or layers. As disclosed in the copending application cited above, the bricks are hacked onto a vertically movable carrier suspended from a monorail, the carrier being movable along the rail for transporting the hack to an unloading station. The present invention deals with an apparatus for effecting a precise transfer of the hack from a movable carrier to a surface upon which the units are supported in arranged fashion for further processing, and is particularly suitable for use in connection with a carrier of the character described above, although it will be understood that other carriers adapted for guided movement along preselected paths might also be used.

Referring to the drawings, Figure 4 shows a pair of carriers 14 suspended from horizontal monorails 15. Each carrier is equipped with a cantilever support member 16 having a horizontal portion 17 and a depending vertical portion 18. The base 19 of the carrier may be welded or otherwise rigidly secured to the lower portion of the cantilever arm, the arm projecting downwardly a short distance below the base to provide a catch portion 20.

The horizontal portion of arm 16 extends forwardly above the base 19 of the carrier and is equipped with a hanger 21 which receives the hook 22 of a hoist 23. Counter-balancing weights 24 are mounted adjacent the front end of the horizontal portion to offset the weight of the cantilever arm or member behind the point of suspension.

Preferebaly, the hoist is provided with an electric motor 25 for retracting or extending the cables 26 connected to hook 22. In addition, the motor may be operatively connected to the wheels 27 provided by the hoist for moving the carrier along the monorail. Since the hoist structure is entirely conventional, a more detailed description of that structure is believed unnecessary for the purpose of disclosing the present invention. It will be noted however that other power means for operating the hoist may be employed and that, if desired, the hoist may be adapted for manual operation.

Referring to Figure 2 it will be seen that base 19 of the carrier is equipped with a pair of upwardly and inwardly turned side flanges 28 and a plurality of uniformly spaced upstanding ribs 29 formed integrally with the base and extending longitudinally with reference thereto. These ribs not only guide the placement of bricks in the foundation layers during a hacking operation and maintain those bricks in proper position but also reinforce and greatly strengthen the base of the carrier structure. It will be noted that the walls of the ribs are spaced apart along the lower portions thereof to accommodate a plurality of rollers 30. Preferably, each of the elongated ribs is provided with two or more rollers so that the weight of the carrier and its load is uniformly distributed upon the base or bottom wall 19 when the rollers engage a support surface.

In the illustration given, a kiln car 31, having a flat upper surface 32, is provided for receiving the hacks 10 as they are transferred from carriers 14. The car is equipped with wheels 33 and rides upon rails 34 which lead into a kiln, such as a tunnel kiln, where the raw bricks are fired. It will be understood, however, that other movable support surface providing means may be used. Furthermore, while the present invention eliminates the necessity of laying foundation or "finger" brick across the surface upon which the hacks are to be transferred, the receiving surface might be provided with ribs or with spaced rows of brick to facilitate the unloading operations after the blanks have been dried and fired. This is particularly true where a fork lift is to be subsequently used for removing the hacks from the support or transfer surface.

As shown most clearly in Figures 1 and 4, car 31 is wide enough to accommodate pairs of hacks 10 arranged in side by side relation upon surface 32. The horizontally aligned monorails 15 approach the transfer station from opposite directions and terminate directly above a kiln car in loading position. Each monorail is provided with a stop 35 which is disposed for engaging the wheels 27 of hoist 23 and for preventing further forward movement of the carrier supported thereby when the rear surface of the hack resting upon the carrier base is substantially aligned with a vertical plane extending along the side of rail car 31. When the hoist wheels of each carrier so engage the respective stops 35 and the rollers of that carrier contact the platform surface of the rail car, the depending projection or catch 20 of the carrier's cantilever arm will engage the upstanding hook portion 36 of retracting arm 37, as illustrated on the right hand side of Figure 4.

Each of the carrier retracting arms adjacent the transfer station extends outwardly in the same direction as the monorail disposed directly thereabove—that is, in a direction transverse to rails 34 and rail car 31. The horizontal retracting members are slidably supported by elongated frames 38 which have their inner opposing ends spaced apart so as not to obstruct movement of the rail car disposed therebetween. Frames 38 may be mounted upon the floor surface 39 in any suitable manner and are equipped with longitudinally extending slots 40 (Figure 1) through which depending outer end portions 41 of arms 37 project. Beneath each frame is a hydraulic cylinder 42, the piston shaft 43 carried by that cylinder being fixed to the depending connecting portion 41 of the retracting arm. Conduits 44 communicate with a suitable source of pressure fluid and carry that fluid towards and away from opposite ends of the cylinder to reciprocate shaft 43 and drive the retracting arm 37 towards or away from rail car 31.

On each side of the rail car is a pair of complementary gate or stop members 45 which are pivotally mounted upon a pair of upstanding frame members 46. The remote ends of each pair of gates are connected to piston rods 47 carried by frame-supported piston cylinders 48. When the piston rods are driven downwardly by hydraulic fluid within the piston chambers, the gates of each pair pivot upwardly and away from each other along a vertical plane aligned with the side edge of horizontal support surface 32 to permit a loaded carrier 14 to pass therebetween. When the piston rods move upwardly, the gates swing into generally horizontal alignment to form, in effect, a continuous stop member along the side of the car and slightly above the support surface provided thereby.

It will be noted that the gates 45 are adapted to pass through the space between the vertical portion of the cantilever arm 16 and the hack 10 supported by the carrier when that carrier is in a load-transferring position above the support surface of the rail car. Each gate is provided with a plurality of spaced recesses 49 along the lower edge thereof for accommodating the vertical ribs and side flanges projecting upwardly from the carrier base. Consequently the gates may be pivoted into lowered position along the bottom course of bricks and between the hack and the cantilever arm without engaging the base of the carrier.

Preferably, the length of the rail car's support surface is slightly greater than some multiple of the width of each hack supported by carriers 14. In the embodiment illustrated in Figure 1, the car has a platform surface long enough to support three hacks along each side thereof. However, it will be understood that platforms of other lengths might be provided for accommodating different numbers of hacks.

Figures 5 and 6 illustrate means for accurately and positively locating the rail car at different loading positions and for advancing the car from one position to the next, in a direction transverse to the direction of movement of the platform carriers. Between rails 34 is an endless chain 50 entrained about a drive sprocket 51 which is rotated by any suitable power means such as an electric motor (not shown). One or more idler sprockets 52 may be provided for maintaining the chain at the proper elevation. Chain lugs 53 are spaced along the chain and engage the downwardly projecting car lugs provided by the rail car, thereby urging the car along the track beneath the overhead monorails as chain 50 is rotated. However, it is to be understood that other means might be provided for advancing the car and that, if desired, the rails may be inclined to permit free movement of the car between each of the successive load-transferring stations determined by the car-stopping means.

Along track 34 are mounted a plurality of stop assemblies 55, two of these assemblies being shown in Figure 5. In the illustration given, each assembly comprises a support bracket 56 rigidly secured to the rail, a stop member or chock 57 pivotally secured to the support bracket by shaft 58, and pivoting means represented as a solenoid 59 connected to the stop member by link 60 for swinging the stop member between the two positions represented in Figure 6. When the stop member is in the retracted position indicated by dotted lines in the drawing, the wheels 33 of the rail car are free to pass over the track without engaging the stop member. However, when the member 57 is pivoted into an extended position, a portion of that member extends over the top surface of the rail to engage the car wheel and prevent advancement of the car during a hack transferring operation. The number of stop assemblies and the distance between those assemblies along the rail depends upon the length of the rail car and the dimensions of the hacks transferred thereto. For example, where the rail car is long enough to accommodate three hacks along each side thereof, three stop assemblies will be mounted upon the rail, the distance between the respective stop members corresponding with the width of each hack unloaded from carriers 14.

In the operation of the illustrated embodiment, kiln car 31 is driven forwardly by chain 50 until the front wheel of that car engages the extended chock of the first of the series of stop assemblies 55. The suspended carriers 14 approach the transfer station from opposite sides thereof and come to a stop above the front portion of the rail car's support surface when the wheels of hoists 23 abut terminal stops 35. The power units of the hoist are then actuated to lower the carriers until the rollers 30 engage surface 32. When the loaded carriers are fully lowered, the hook portions 36 of the carrier retracting members 37 engage the depending portions 20 of the carrier structures. The hydraulically operated stop members on each side of the rail car swing downwardly along a plane normal to the direction of movement of the retracting members and engage the hack supported by each carrier to prevent horizontal movement of the hack as the carrier is withdrawn from support surface 32 by the piston-operated retraction member. The unloaded carriers are then returned to a hacking station where additional stacks of ceramic units are placed thereon.

While another set of loaded carriers is being moved towards the transfer station, solenoid 59 of the first stop assembly is actuated to swing the chock away from the wheel of the rail car. Chain 50 is again rotated until one of the chain lugs 53 engages a rail car lug 54 and drives the rail car into a second position wherein the rail car's wheel contacts the chock of the second stop assembly. The flow of hydraulic fluid in the retraction cylinders 42 is reversed to position the carrier retracting members 37 in their original location. The second pair of loaded carriers are then disposed above the intermediate portion of the rail car's support surface and the above-described procedure is repeated to transfer the hacks from the carriers to the rail car. This sequence of steps is thus continued until the car has received a full complement of stacked brick. All of the chocks of the several stop assemblies are then swung into retracted position and the rail car is directed by any suitable power means to a processing station where the ceramic units carried upon the support surface of the car are dried or fired.

From the foregoing, it is believed apparent that the present invention includes structure for precisely positioning a pair of movable carriers so that a stack of ceramic units may be transferred from one carrier to an exact location upon the other carrier. For achieving this result, both carriers are guided for movement along preselected intersecting paths. Stop means, in the form of stops 35 and stop assemblies 55, prevent advancement of the respective carriers while a load of brick is being transferred from one to the other and thereby insure precise orientation of a stack of brick upon the transfer surface. Stops 35 at the ends of the monorails serve to stop carrier 14 in a load-transferring position directly above the support surface of the movable rail car 31 when that car engages any of the chocks or stops 57 spaced along the track, while the series of stops 57 operate to hold the elongated rail car in predetermined positions wherein preselected portions of its support surface are sequentially disposed beneath the monorail carrier when that carrier is in its load-transferring position. In this manner, the stacks of brick are accurately guided and positioned for transfer into exact locations upon the movable support surface.

While in the foregoing I have disclosed an embodiment of the present invention in considerable detail for purposes of illustration, it will be understood that many of these details may be varied without departing from the spirit and scope of the invention.

I claim:

1. In an apparatus for transferring stacks of ceramic units, a movable carrier having a surface for supporting at least one stack of ceramic units, means for guiding movement of said carrier along a predetermined path, a car having an elongated support surface for supporting a plurality of longitudinally arranged stacks of ceramic units, a track for guiding movement of said car along a generally horizontal path substantially normal to the path of said carrier, means for stopping said carrier in a load-transferring position wherein the surface thereof is disposed along the path of movement of said car, means for advancing said car along said track, and a series of uniformly spaced releasable stops provided by said track and co-acting with said advancing means for stopping said car at predetermined positions wherein preselected portions of the support surface thereof are progressively disposed beneath the surface of said carrier when the same is in load-transferring position, said advancing means bearing against said car and co-acting with said stops for preventing both forward and rearward movement of the car along the track when the same is in load-transferring position.

2. In an apparatus for transferring and for precisely locating stacks of ceramic units, a first carrier having a support surface for supporting at least one stack of said units and being guided for movement along a generally horizontal predetermined path, a second carrier having a support surface for supporting a longitudinal series of stacks of ceramic units and being guided for movement along a generally horizontal path at substantially right angles to the path of said first carrier, means for positively limiting advancement of said first carrier in one direction along said predetermined path and for stopping and precisely positioning the same in a load-discharging position wherein the support surface of said first carrier is disposed directly above the path of said second carrier, a plurality of uniformly spaced and retractable stops co-operating with said second carrier for stopping the same at predetermined successive load-receiving positions wherein preselected portions of the support surface thereof are disposed beneath the support surface of said first carrier when the same is in load-discharging position, and advancing means for advancing said second carrier along said horizontal path and for urging and holding said second carrier against said stops, whereby, said advancing means coacts with said stops to prevent movement of said second carrier in either direction along said path when said second carrier is in load-receiving position.

References Cited in the file of this patent

UNITED STATES PATENTS

| | | |
|---|---|---|
| 710,643 | Wilcox | Oct. 7, 1902 |
| 1,148,531 | Oldham | Aug. 3, 1915 |
| 1,197,354 | Dickinson | Sept. 5, 1916 |
| 1,354,250 | Hawthorne | Sept. 28, 1920 |
| 1,487,573 | Ingram | Mar. 18, 1924 |
| 1,490,235 | Smith et al. | Apr. 15, 1924 |
| 2,467,113 | Deiters | Apr. 12, 1949 |
| 2,572,650 | Molins | Oct. 23, 1951 |
| 2,715,971 | Cox | Aug. 23, 1955 |
| 2,804,218 | Sylvester et al. | Aug. 27, 1957 |

FOREIGN PATENTS

| | | |
|---|---|---|
| 617,443 | Germany | Aug. 19, 1935 |